(12) United States Patent
Kirkpatrick

(10) Patent No.: US 7,870,488 B2
(45) Date of Patent: Jan. 11, 2011

(54) MEDIA EDITING SYSTEM

(75) Inventor: Chris Kirkpatrick, Bridgewater, NJ (US)

(73) Assignee: Transcript Associates, Inc., New York, NY (US)

( * ) Notice: Subject to any disclaimer, the term of this patent is extended or adjusted under 35 U.S.C. 154(b) by 1476 days.

(21) Appl. No.: 11/055,178

(22) Filed: Feb. 10, 2005

(65) Prior Publication Data

US 2006/0179403 A1    Aug. 10, 2006

(51) Int. Cl.
G06F 17/00    (2006.01)

(52) U.S. Cl. ...................... 715/720; 715/721

(58) Field of Classification Search .............. 715/723, 715/206–208, 200, 720, 721
See application file for complete search history.

(56) References Cited

U.S. PATENT DOCUMENTS

| | | | |
|---|---|---|---|
| 5,420,725 A | | 5/1995 | Hsu et al. |
| 5,617,539 A | * | 4/1997 | Ludwig et al. ............. 709/205 |
| 5,625,570 A | | 4/1997 | Vizireanu et al. |
| 5,701,153 A | | 12/1997 | Reichek et al. |
| 5,835,667 A | * | 11/1998 | Wactlar et al. ................ 386/96 |
| 6,173,287 B1 | * | 1/2001 | Eberman et al. ............ 707/102 |
| 6,260,011 B1 | * | 7/2001 | Heckerman et al. ......... 704/235 |
| 6,430,357 B1 | * | 8/2002 | Orr ............................. 386/69 |
| 6,567,980 B1 | * | 5/2003 | Jain et al. ..................... 725/61 |
| 6,754,435 B2 | * | 6/2004 | Kim ............................. 386/69 |
| 6,789,080 B1 | | 9/2004 | Sweet et al. |
| 6,845,485 B1 | * | 1/2005 | Shastri et al. ............... 715/203 |
| 6,912,726 B1 | * | 6/2005 | Chen et al. .................. 725/113 |
| 7,024,677 B1 | * | 4/2006 | Snyder et al. ................. 725/86 |
| 7,106,381 B2 | * | 9/2006 | Molaro et al. ............... 348/468 |
| 7,139,813 B1 | * | 11/2006 | Wallenius .................... 709/219 |
| 2001/0003214 A1 | * | 6/2001 | Shastri et al. ............... 725/109 |
| 2002/0056096 A1 | * | 5/2002 | Mori et al. .................... 725/38 |
| 2004/0177317 A1 | * | 9/2004 | Bradstreet ................ 715/500.1 |
| 2007/0091093 A1 | * | 4/2007 | Li et al. ....................... 345/473 |
| 2007/0250775 A1 | * | 10/2007 | Marsico et al. ............. 715/716 |

OTHER PUBLICATIONS

Sony Vegas (NPL,—Vegas 3.0 Manual, Published 1999-2002, pp. 1-294).*

* cited by examiner

*Primary Examiner*—Stephen S Hong
*Assistant Examiner*—Manglesh M Patel
(74) *Attorney, Agent, or Firm*—DeMont & Breyer, LLC

(57) ABSTRACT

An audio and video editing system is disclosed. The editing system uses a displayable object document that comprises: (i) a verbal transcript of an audio recording (e.g., a stored version of a recorded interview, etc.), and (ii) one or more hyperlinks into one or more video recordings, where each video recording is a stored version of a video recording (e.g., of a participant in a interview, etc.). Each hyperlink in the object document associates a portion of the stored video recording with a hyperlink caption in the object document. Each time code that appears in the object document is a hyperlink caption that points to a different portion of the video recording. A user can access a desired portion of the video recording by selecting the associated hyperlink caption in the object document.

24 Claims, 19 Drawing Sheets

Figure 2 (Prior Art)

WRITTEN TRANSCRIPT 200

10:23:07.05   *Smith*: On Friday, you announced a committee to look into what went wrong in the chain of events leading up to the incident. Why has it taken so long to get things started?

10:23:20.29   *Jones*: Well, you don't want to rush into these kinds of things. Sure, there are always people who want you to get to the bottom of things immediately. We get that kind of pressure all of the time. But I feel that it pays to take a cautious, measured approach to such an important issue as this one. And I feel that once we start getting answers to all of the tough questions, people will feel that we were right in waiting to get the committee going.

10:23:43.13   *Smith*: There is also a similar, investigative committee being established by the Freedonian government. What do you believe is

MEDIA EDITING SYSTEM

FIELD OF THE INVENTION

The present invention relates to information technology in general, and, more particularly, to audio and video editing equipment.

BACKGROUND OF THE INVENTION

When a news reporter interviews a subject, the interview is typically recorded with two video cameras—one covering the reporter and one covering the subject—and with a microphone that records both voices. The output of one video camera is stored in one video recording, the output of the second video camera is stored in a second video recording, and the output of the microphone is stored in an audio recording. FIG. 1 depicts a scene of such an interview.

Video camera 102-1 films Jones 102 and its output is stored on video-recorder 103-1. Video camera 102-2 films Smith 101 and its output is stored on video-recorder 103-2. Microphone 105 picks up the voice of both Smith 101 and Jones 102 and its output is recorded on audio recorder 104.

To facilitate the editing of the interview, a written transcript of the interview is produced from the audio recording. FIG. 2 depicts a typical written transcript as it is well known in the prior art. The transcript comprises two columns of text. The second or right-hand column comprises a textual representation of the words spoken by Mr. Smith and the words spoken by Ms. Jones. The text alternates between the words of Mr. Smith and the words of Ms. Jones, and reflects the back-and-forth nature of a typical interview.

The first or left-hand column comprises a textual representation of one or more time codes. A time code is a signal that is generated and distributed by one of the video cameras and is recorded with each audio and video recording.

Each time code is a more-or-less-arbitrarily-chosen reference value that enables the temporal correlation of the video and audio recordings. Typically, the time code is represented in an hour:minute:second.frame format. Despite the name of the code and its hour:minute:second:frame format, the time code is not related to the real time at which the recording was made, and might or might not bear a relation to the elapsed time at which the recording was made.

On the transcript, each time code is associated with a passage of text. For example, as depicted in FIG. 2 the time code "10:23:20.29" is associated with the portion of transcript 201 that is itself associated with the video recording in which Ms. Jones can be heard uttering "Well, you don't want to rush . . . ."

The time codes perform two functions. First, the time codes are printed on the transcript so that the editor of the interview can correlate each passage of text with its position in the audio and video recordings. This helps the editor locate and view the video and audio recordings to ensure that the speaker's mien is consistent with the import of the written transcript. Second, the presence of the time codes in the audio and video recordings enables the editor to perfectly synchronize the video recordings with each other and with the audio recording.

The need exists, however, for a system for editing audio and video recordings that is more advantageous than systems in the prior art.

SUMMARY OF THE INVENTION

The present invention enables a technique for editing audio and video recordings without some of the costs and disadvantages associated with editing systems in the prior art. In particular, the illustrative embodiment of the present invention simplifies many of the tasks performed during the editing process and provides many new capabilities to facilitate the editor's job.

As an example, the audio and video of an interview between the fictional characters Smith and Jones are recorded, a verbal transcript that constitutes an object document is created and stored in the editing system of the illustrative embodiment, and the audio and video recordings from the interview are converted into computer files and stored in the editing system as audio and video recordings. The video recording or recordings from a recorded event are synchronized with the audio recording. The audio recording is represented in the object document as the verbal transcript. In the course of creating the object document, the time codes taken from the original recording and that are embedded in the object document along with the transcript are converted into hyperlink captions. Subsequently, when a user of the editing system selects one of the hyperlink captions of the displayed object document, the editing system displays the portion of the video recording that corresponds to the time code hyperlink reference to which the hyperlink is pointing.

In accordance with the illustrative embodiment, the object document further comprises hyperlinks that have hyperlink captions other than time codes. In accordance with the illustrative embodiment, the editing system initially receives transcript text along with a time code and, based on the received text and time code, estimates a second time code for a word in the text. The estimation of the second time code is also based, in some alternative embodiments, on an additional time code or on an interpolation of words from the received text, to name a few possibilities. The editing system then uses the estimated time code in creating a hyperlink to the corresponding portion of a video recording. For example, in the object document of the Smith/Jones interview, a word from the text can be hyperlink-captioned to point to the estimated second time code, which provides a finer granularity of time between time code references and enables the user of the editing system to find a portion of the video recording that is somewhere between two consecutive time code captions.

The editing system of the illustrative embodiment also displays an index document, in addition to the object document and the video recording. The index document comprises an index of hyperlink captions. At least one of the hyperlink captions in the index is associated with a hyperlink into the displayed object document or with another object document that is stored in the editing system, but not presently displayed. A user can display a non-displayed object document by selecting an associated hyperlink caption in the index. The user may then select a hyperlink caption in the newly-displayed object document to display the corresponding portion of a video recording.

The editing system of the illustrative embodiment also enables the editing of a composite recording and the displaying of a representation of the composite recording. The composite recording comprises one or more portions of one or more video recordings. The user of the editing system drags-and-drops graphical objects that represent portions of video into the composite recording display pane. The display objects that represent the added portions of video are ordered to show the relative position within the composite recording of each added portion with respect to each other. For example, a producer of an interview between a news reporter and a newsmaker can use the drag-and-drop capability to put together a refined presentation, stored in a composite recording, from the raw recordings of the interview.

The illustrative embodiment of the present invention comprises: (a) displaying a first object document that comprises: (i) a verbal transcript of a first audio recording, and (ii) a plurality of hyperlinks into a first video recording that is temporally synchronized with the first audio recording, wherein each of the hyperlinks into the first video recording associates a portion of the first video recording with a hyperlink caption in the first object document; (b) receiving a first signal that selects one of the hyperlinks into the first video recording; and (c) displaying the portion of the first video recording associated with the hyperlink selected by the first signal.

BRIEF DESCRIPTION OF THE DRAWINGS

FIG. 2 depicts written transcript 200 in the prior art.

DETAILED DESCRIPTION

Figure 3:
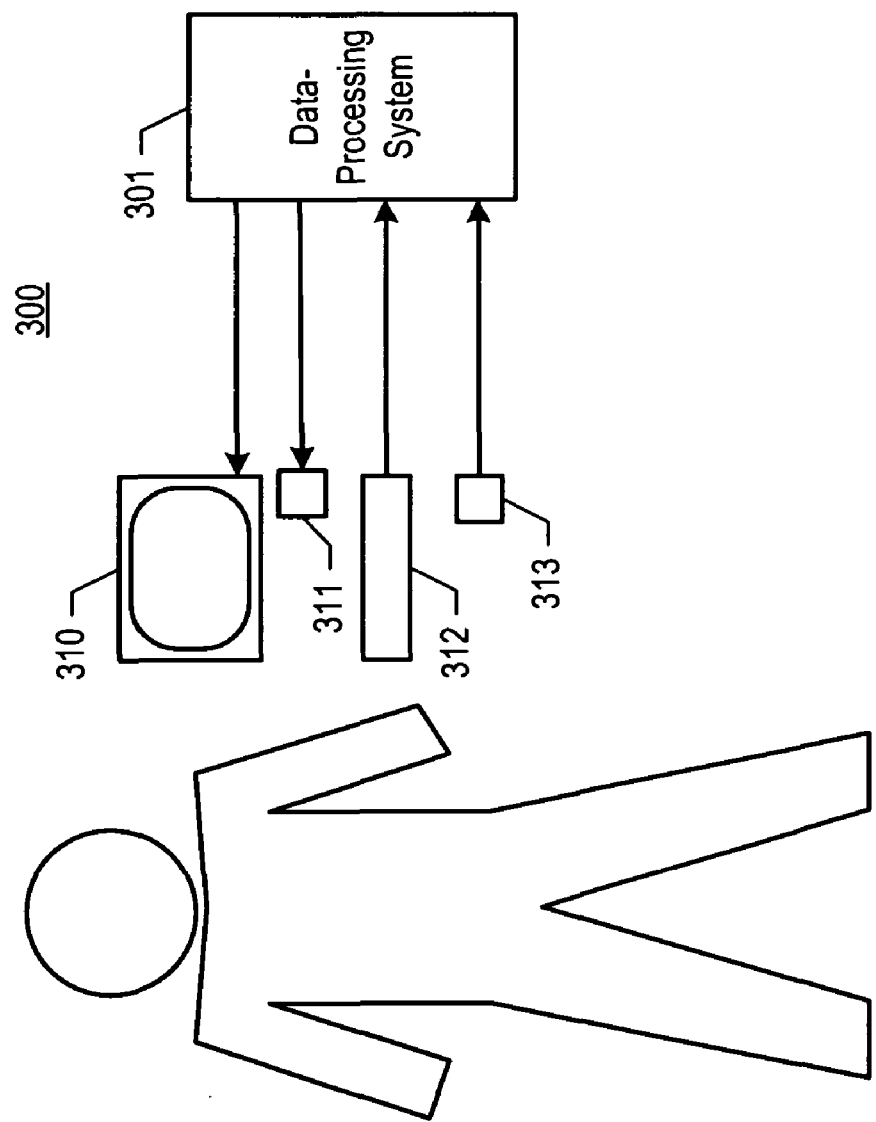
FIG. 3 depicts a block diagram of the salient components of editing system 300 in accordance with the illustrative embodiment of the present invention.

FIG. 3 depicts a block diagram of the salient components of editing system 300 in accordance with the illustrative embodiment of the present invention. Editing system 300 comprises: data-processing system 301, video display 310, speaker 311, keyboard 312, and pointing-device 313, interconnected as shown.

Data-processing system 301 is a general-purpose computer that comprises a processor, memory, and input and output interfaces for a user interface. Data-processing system 301 is capable of performing the tasks described below and with respect to FIGS. 12 through 16. In particular, data-processing system 301:

i. outputs a video signal to video display 310, in well-known fashion, and
ii. receives a keyboard signal from keyboard 312, in well-known fashion, and
iii. receives a pointing and command signal from pointing-device 313, in well-known fashion, and
iv. outputs a speaker signal to speaker 311, in well-known fashion.

Data-processing system 301 provides a graphical user interface, in well-known fashion, and is capable of accepting user-level commands via:

i. keyboard 312, or
ii. pointing device 313, or
iii. the combination of i and ii.

Video display 310 is a display as is well-known in the art that receives a video signal and creates a visual image of the signal for a user. It will be clear to those skilled in the art how to make and use video display 310.

Speaker 311 is an electro-acoustic transducer as is well known in the art that receives a speaker signal and creates an audible sound of the signal for a user. It will be clear to those skilled in the art how to make and use speaker 311.

Keyboard 312 is a character input device as is well-known in the art that receives input from a user and transmits keyboard signals representing that input. It will be clear to those skilled in the art how to make and use keyboard 312.

Pointing device 313 is a spatial input device (e.g., a mouse, a joystick, a touchpad, a stylus, etc.) as is well known in the art that receives spatial and command (e.g., button, wheel, etc.) input from a user and that transmits pointing and command signals representing that input. It will be clear to those skilled in the art how to make and use pointing device 313.

Figure 4:
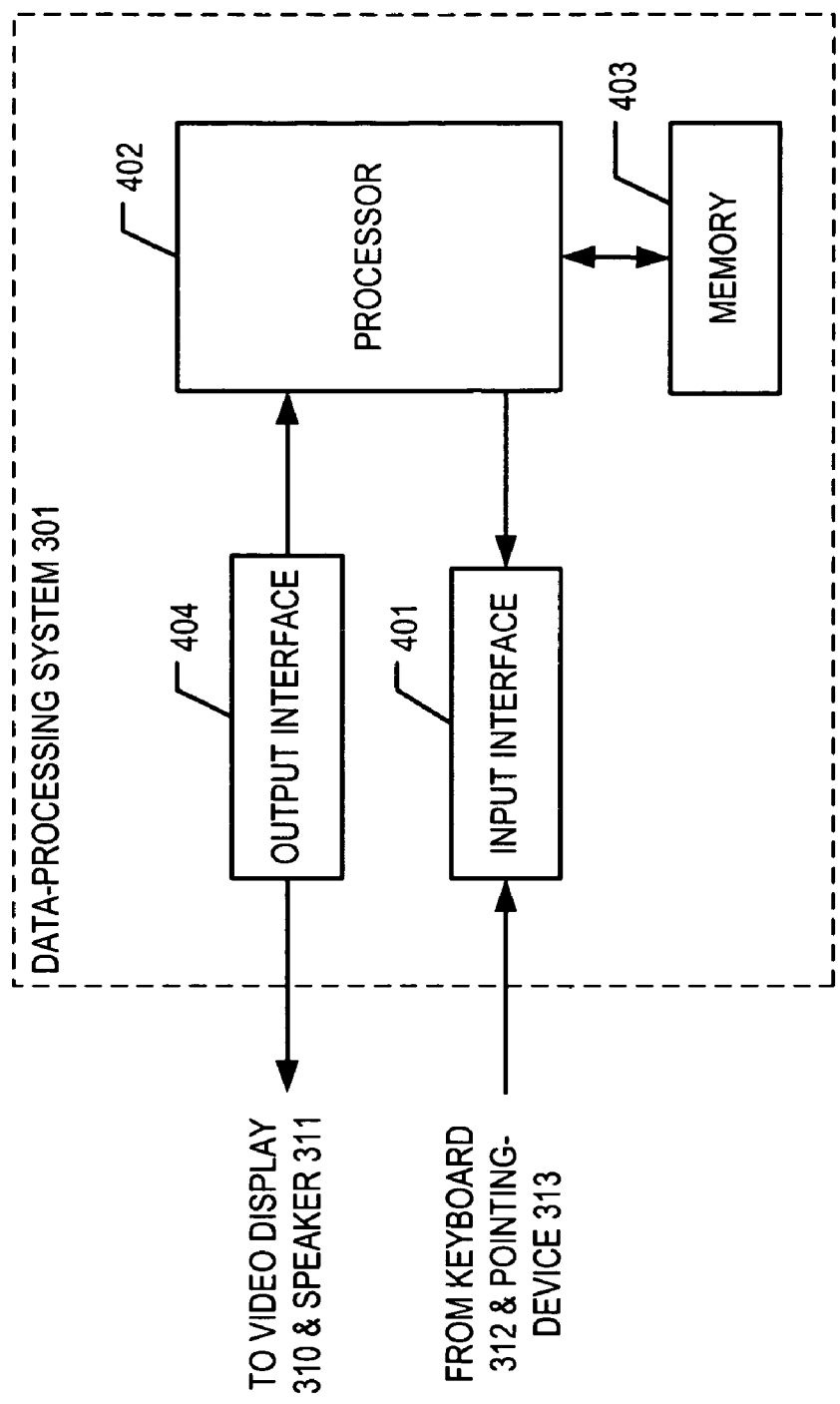
FIG. 4 depicts a block diagram of the salient components of data-processing system 301, in accordance with the illustrative embodiments of the present invention.

FIG. 4 depicts a block diagram of the salient components of data-processing system 301, in accordance with the illustrative embodiments of the present invention. Data-processing system 301 comprises input interface 401, processor 402, memory 403, and output interface 404, interconnected as shown.

Input interface 401 receives signals from keyboard 312 and pointing-device 313, and forwards the information encoded in the signals to processor 402, in well-known fashion. It will be clear to those skilled in the art how to make and use input interface 401.

Processor 402 is a general-purpose processor that is capable of: receiving information from input interface 401; reading data from and writing data into memory 403; executing the tasks described below and with respect to FIGS. 12 through 16; and transmitting information to output interface 404. In some alternative embodiments of the present invention, processor 402 might be a special-purpose processor. In either case, it will be clear to those skilled in the art, after reading this specification, how to make and use processor 402.

Memory 403 stores data and executable instructions, in well-known fashion, and is a combination of volatile and non-volatile memory. It will be clear to those skilled in the art, after reading this specification, how to make and use memory 403.

Output interface 404 receives information from processor 402, and outputs signals that encode this information to video display 310 and speaker 311, in well-known fashion. It will be clear to those skilled in the art, after reading this specification, how to make and use output interface 404.

Figure 5:
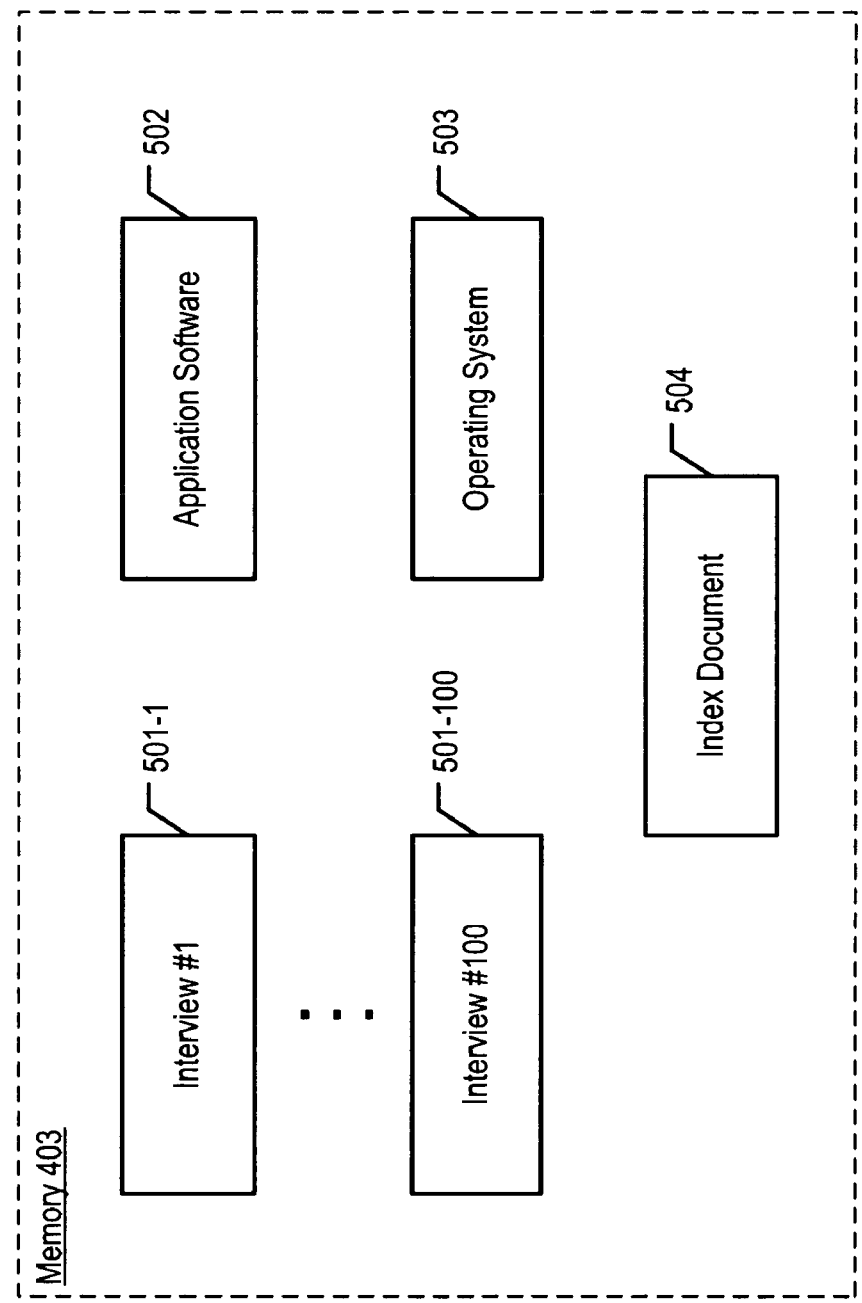
FIG. 5 depicts a map of the salient contents of memory 403.

FIG. 5 depicts a map of the salient contents of memory 403, which comprises the files relating to 100 interviews, interviews 501-1 through 501-100, application software 502, operating system 503, and composite index document 504.

The files associated with the interviews are described in detail below and with respect to FIG. 6.

Application software 502 is the software portion of the editing system described below and with respect to FIGS. 7 through 20. Operating system 503 is an operating system, in well-known fashion, that performs input/output, file and memory management, and all of the other functions normally associated with operating systems. It will be clear to those skilled in the art how to make and use operating system 503.

Composite index document 504 is a file that contains an integrated index for all of interviews 501-1 through 501-100. Composite index document 504 is described in detail below and with respect to FIGS. 7 through 20.

Figure 6:
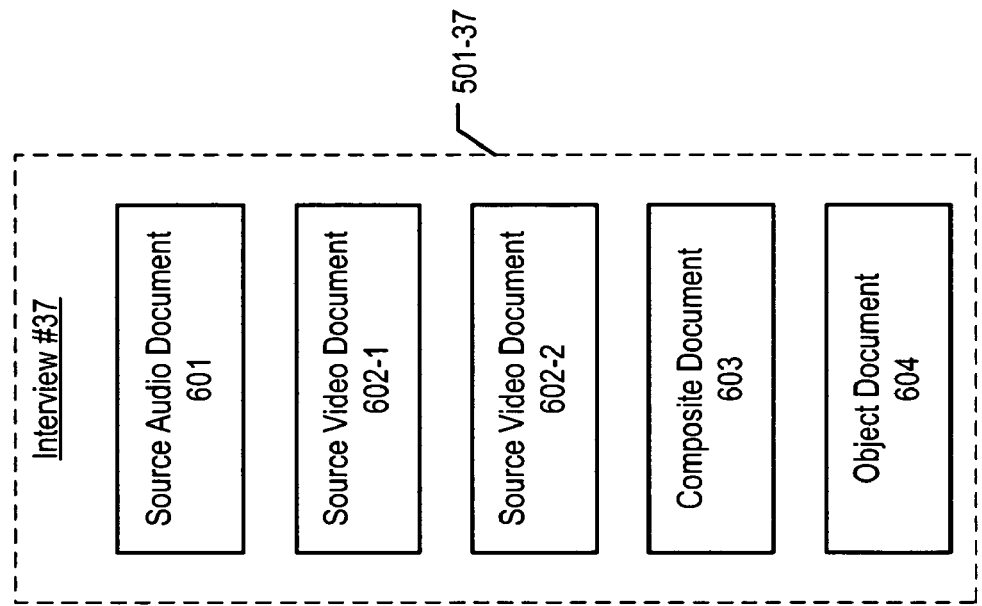
FIG. 6 depicts a map of the files associated with interview 501-37, which is one of the 100 interviews contained in editing system 300.

FIG. 6 depicts a map of the files associated with interview 501-37, which is one of the 100 interviews contained in editing system 300. The files include source audio document 601, source video document 602-1, source video document 602-1, composite document 603, and object document 604.

Source audio document 601 comprises the audio portion of the interview between Mr. Smith and Ms. Jones and the series of time codes that were recorded with the audio.

Source video document 602-1 comprises the video of Ms. Jones during the same interview and the same series of time codes, and source video document 602-2 comprises the video of Mr. Smith during the same interview and the same series of time codes.

Composite document 603 is a composite of source audio document 601, source video document 602-1, source video document 602-2, and index document 504, and is constructed in the manner described below and with respect to FIGS. 7 through 20.

Object document 604 comprises the written transcript of source audio document 601, the associated time codes, and graphic objects as described below and with respect to FIGS. 7 through 20.

Figure 7:
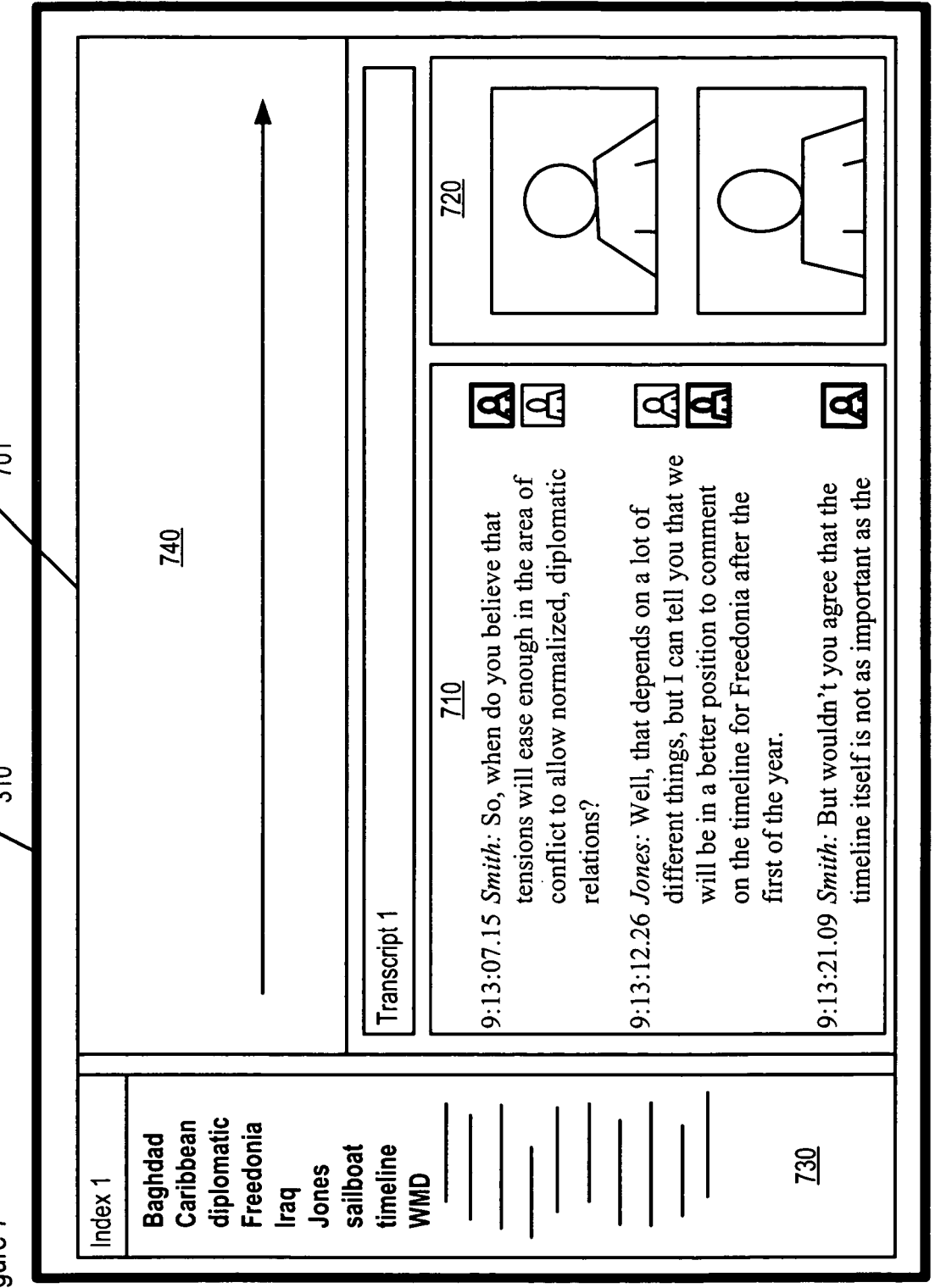
FIG. 7 depicts an image of video display 310 in accordance with the illustrative embodiment of the present invention.

FIG. 7 depicts an image on video display 310 in accordance with the illustrative embodiment of the present invention. Image 701 comprises: object pane 710, video pane 720, index pane 730, and composite pane 740.

Object pane 710 is a graphical display space that displays text and other graphical objects (e.g., an icon, a drop-down box, a tabbed panel, a subpane, etc.), in well-known fashion. In accordance with the illustrative embodiment, object pane 710 displays object document 604. For the purposes of this application, the term "object document" is defined as a document that is derived, in whole or in part, from:

i. one or more video recordings, or
ii. one or more audio recordings, or
iii. a combination of i and ii.

In accordance with the illustrative embodiment, object document 604 is a verbal transcript of source audio document 601. Object pane 710 is described in detail below and with respect to FIG. 8.

Video pane 720 is a graphical display space that displays contemporaneous frames of both source video document 602-1, source video document 602-2. Video pane 720 is described in detail below and with respect to FIG. 9.

Index pane 730 is a graphical display space that displays a portion of index document 504, which is a list of words that exist in one or more object documents. In accordance with the illustrative embodiment, each word in an index document is the hyperlink caption of a hyperlink that points to the source document or documents where the word is found. Index pane 730 is described in detail below and with respect to FIG. 10.

Composite pane 740 is a graphical display space that displays a portion of composite document 603, which is an edited amalgam of one or more source video and audio documents. Composite pane 740 is described in detail below and with respect to FIGS. 16 through 19.

Figure 8:
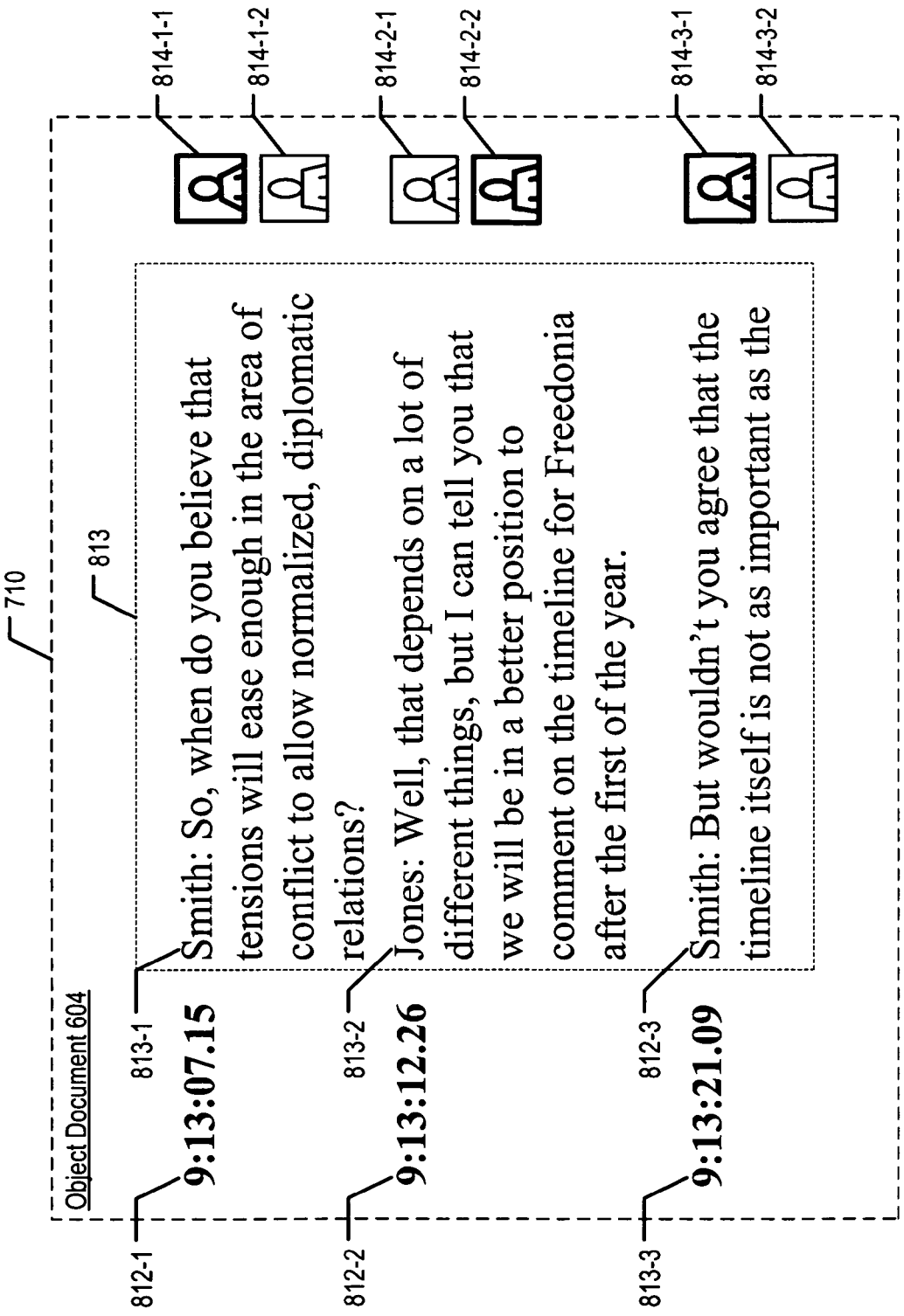
FIG. 8 depicts pane 710 in detail in accordance with the illustrative embodiment of the present invention.

FIG. 8 depicts object pane 710 in detail in accordance with the illustrative embodiment of the present invention. Object document 604 comprises verbal transcript 813, hyperlink captions 812-1 through 812-3, and graphical objects 814-1-1, 814-1-2, 814-2-1, 814-2-2, 814-3-1, and 814-3-2.

Verbal transcript 813 represents a series of passages of dialog as spoken by the individuals in the interview. Each word in verbal transcript 813 is the hyperlink caption of a hyperlink that points to the portion of the source video document associated with the word. Therefore, selecting a word in verbal transcript 813 causes the portions of source video document 602-1 and source video document 602-2 associated with that word to appear in pane 720 and run, simultaneously, with the associated portion of source audio document 601.

Hyperlink captions 812-1 and 812-3 are each uniquely associated with a different portion of source video document 602-1 and hyperlink caption 812-2 is uniquely associated with a portion of source video document 602-2. For example, hyperlink caption 812-1 is the time code of "9:13:07.15." Selecting hyperlink caption 812-1 causes the portions of source video document 602-1 and source video document 602-2 to appear in pane 720 and run, simultaneously, with the associated portion of source audio document 601. This enables the editor of the interview to easily view the video recordings associated with any portion of the interview.

Graphical object 814-1-1 is an icon that is associated with the portion of source audio document 601 and source video document 602-1 that is associated with text 813-1. Graphical object 814-1-1 is highlighted in contrast to graphical object 814-1-2 to indicate that text 413-1 is associated with source video document 602-1 and not source video document 602-2. As is described below and with respect to FIGS. 17 through 20, graphical object 814-1-1 can be drag-and-dropped into composite pane 740, which adds the associated portion of source audio document 601 and source video document 602-1 to composite document 603. This enables the editor to edit the interview and create an edited video document—composite document 603—out of the desired portions of the source video and audio documents.

Graphical object 814-1-2 is an icon that is associated with the portion of source audio document 601 and source video document 602-2 that is associated with text 813-2. As is described below and with respect to FIG. 17 through 20, graphical object 814-1-2 can be drag-and-dropped into composite pane 740, which adds the associated portion of source audio document 601 and source video document 602-1 to composite document 603.

Graphical objects 814-2-1, 814-2-2, 814-3-1, and 814-3-2 are an graphical objects 814-1-1 and 814-1-2.

Figure 9:
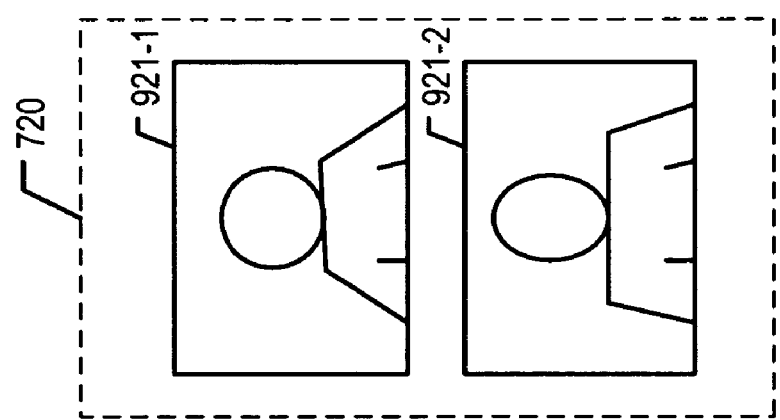
FIG. 9 depicts pane 720 in detail, which displays a portion of source video document 602-1 in subpane 921-1 and a portion of source video document 602-1 in subpane 921-2.

FIG. 9 depicts video pane 720 in detail, which displays a frame of source video document 602-1 in subpane 921-1 and the contemporaneous frame of source video document 602-1 in subpane 921-2. When the portions of source video document 602-1 and source video document 602-2 are running, editing system 300 outputs the associated portion of source audio document 601 through speaker 311.

Figure 10:
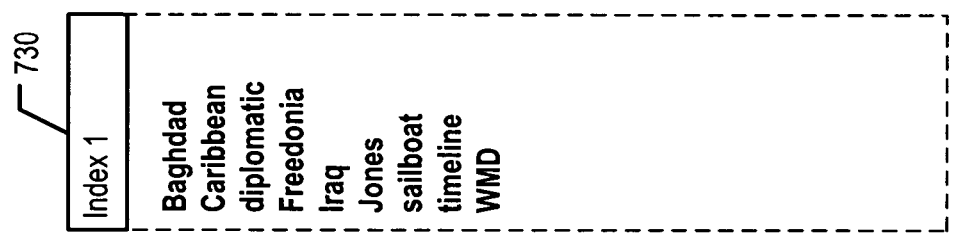
FIG. 10 depicts pane 730 in detail, which displays index document 504.

FIG. 10 depicts index pane 730 in detail, which is an index of all of the transcripts of all of interviews 501-1 through 501-100. In accordance with the illustrative embodiment index document 504 is an alphabetized list of words (e.g., names, places, subjects, etc.) and each word in index document 504 is a hyperlink caption of a hyperlink that points to a particular verbal transcript portion in an object document. The use of index document 504 is described below and with respect to FIGS. 12 and 15.

Figure 11:
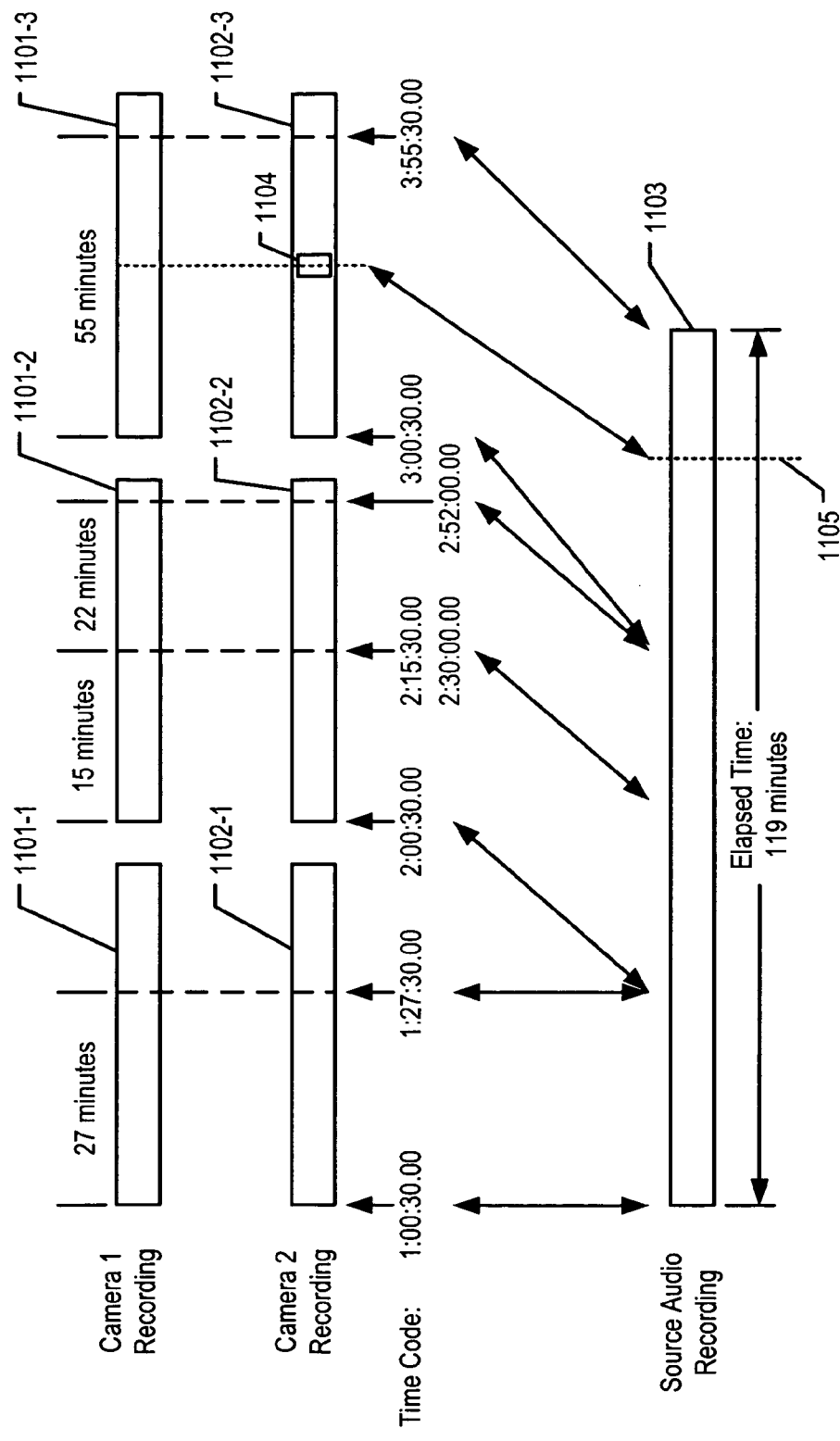
FIG. 11 is a time-line that depicts the relationship between the elapsed time of a interview (e.g., an interview, etc.) and the time codes that are generated during the recording of the interview.

FIG. 11 is a time-line that depicts the relationship between the elapsed time of a interview (e.g., an interview, etc.) and the time codes that are generated during the recording of the interview, and serves to illustrate the process by which each portion of source audio document 601 is correlated to each portion of source video document 602-1 and source video document 602-2.

Figure 1:
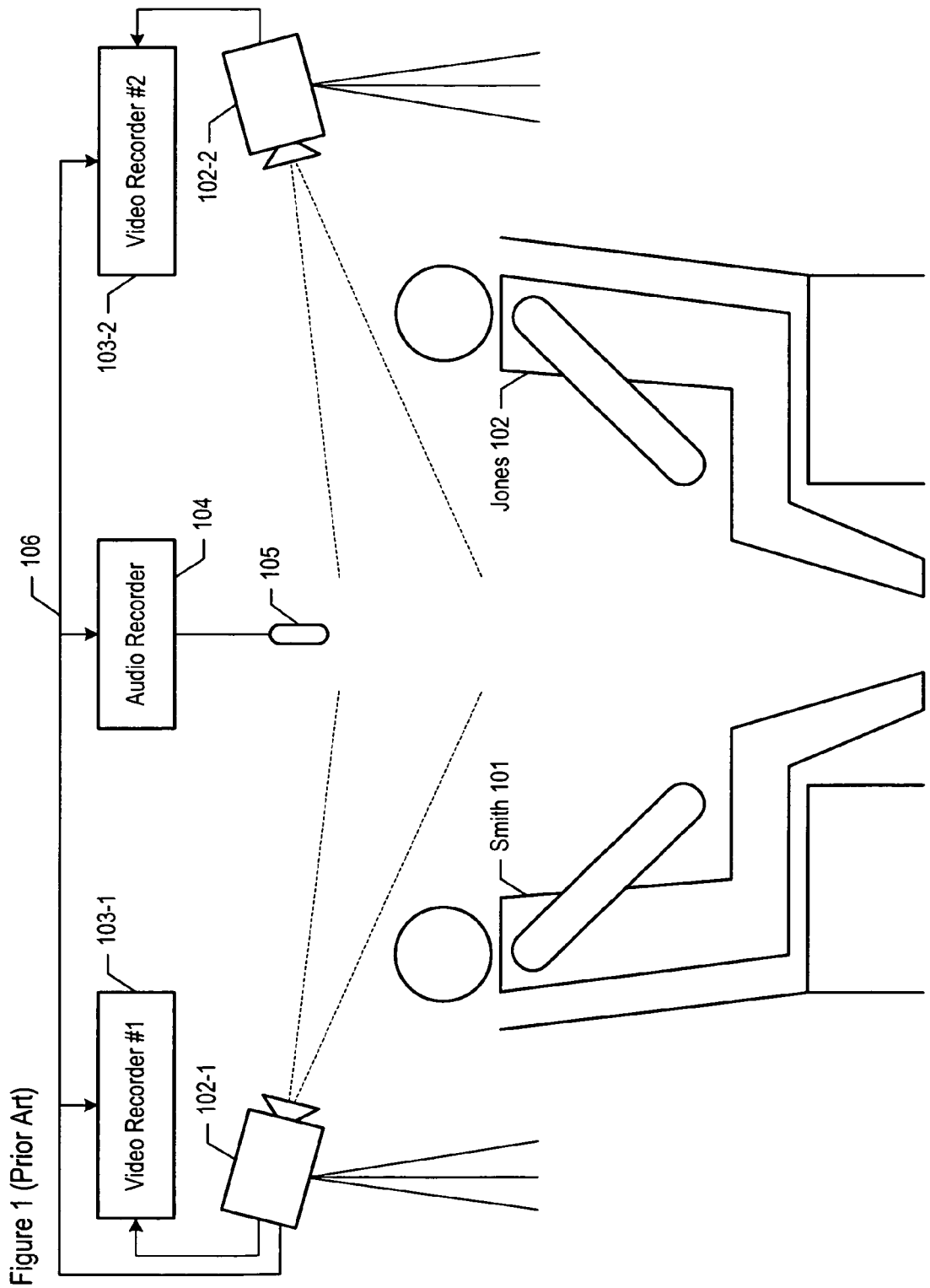
FIG. 1 depicts a scene of a recorded interview between two people: Smith 101 and Jones 102.

Referring to FIGS. 1 and 11, video camera 102-1 and video camera 102-2 record the interview, and video recordings 1101-1, 1101-2, and 1101-3 represent the footage recorded by video camera 102-1 on a first, third, and fifth videotape, respectively. Video recordings 1102-1, 1102-2, and 1102-3 represent the footage recorded by video camera 102-2 on a second, fourth, and sixth videotape, respectively.

During the recording process, the time code is generated and distributed between the two cameras, in well-known fashion, so that both the recorded audio and video tracks are synchronized in time to prevent unwanted effects such as "echoing" (i.e., seeing the first subject while hearing the audio, then cutting to the second subject while hearing a momentary repeat of audio already heard) during the editing process. Each time code is associated with a single frame in the recorded images. The frame is identified in the time code by using a format of "HH:MM:SS.FF," where "HH" is the hour, "MM" is the minute within the hour, "SS" is the second within the minute, and "FF" is the frame number within the second (where there are typically 40 frames per second). The time code in the example is initialized by the camera operator at 1:00:30.00 when the cameras begin shooting.

Twenty-seven minutes later at time code 1:27:30.00, the camera operator decides to use a new set of videotapes—for example, when anticipating an important, upcoming part of the interview that should not be interrupted. The operator removes the first set of tapes (i.e., the first and second tapes) from the cameras, reloads with the second set of tapes (i.e., the third and fourth tapes), and starts the cameras rolling again. The operator initializes the tapes with a new, unique starting time code, 2:00:30.00.

Fifteen minutes into the second set of tapes, the operator decides to re-initialize the time codes to 2:30:00.00. Twenty-two minutes after that, the camera operator decides to use another new set of videotapes. The operator removes the second set of tapes (i.e., the third and fourth tapes) from the cameras, reloads with the third set of tapes (i.e., the fifth and sixth tapes), and starts the cameras rolling again. The operator initializes the tapes with a new, unique starting time code, 3:00:30.00.

Fifty-five minutes into the third set of videotapes, the interview is over. The operator stops shooting footage, and the final time code recorded is 3:55:30.00.

After the recording process of the interview has finished, a technician compiles, in well-known fashion, source audio document 601, which is a compilation of the recorded audio that corresponds to all three sets of video segments. Source audio document 601 is prepared for the purpose of transcribing dialog from the interview into the verbal text of a transcript. Source audio document 601 comprises all of the recorded audio from the interview on a first channel and the recorded time codes, temporally-aligned on a second channel in well-known fashion. The total recorded time of all video segments from a camera is 119 minutes; therefore, the length of audio on source audio document 601 is also 119 minutes.

The technician also converts camera 1 recordings 1101-1, 111-2, and 1101-3 into source video document 602-1, and camera 2 recordings 1102-1, 1102-2, and 1102-3 into video recording 602-2, in well-known fashion. The time code information is preserved in the video recordings and the audio recording to enable temporal synchronization of the recordings with respect to each other. It will be clear to those skilled in the art how to temporally synchronize video recording 602-2 and video recording 602-2 with source audio recording 601 so that when a portion of a first video recording is selected and played, the corresponding portion of a second video recording from the same interview plays simultaneously, and the corresponding portion of audio also plays simultaneously.

When the transcriber generates object document 710 from source audio recording 601, each hyperlink is created with a hyperlink reference that comprises a time code, in accordance with the illustrative embodiment. Data-processing system 301 uses the time code in the hyperlink reference to find and display the associated portion of video recording 412-1. It will be clear to those skilled in the art how to create a hyperlink reference that points to a portion of video recording 412-1.

Figure 12:
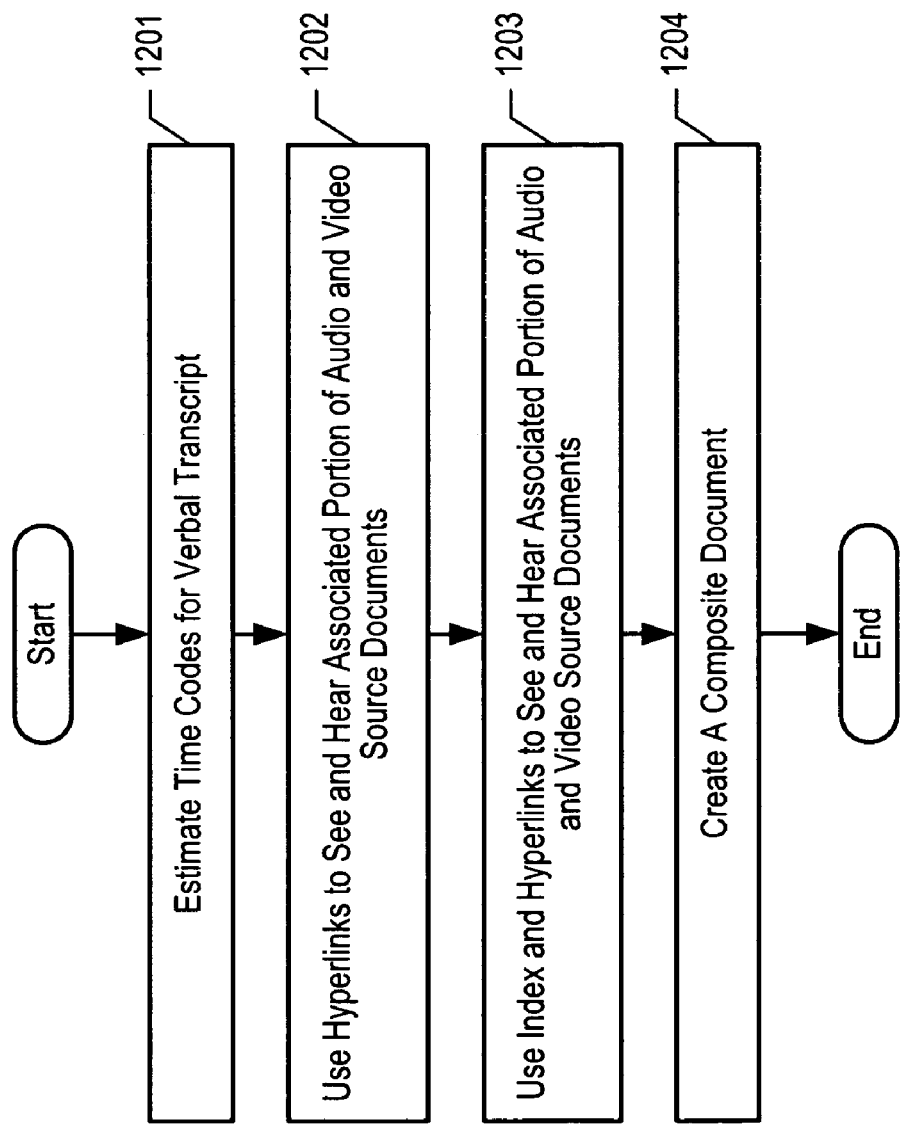
FIG. 12 depicts a flowchart of the salient tasks associated with editing a video interview that comprises one or more portions of audio/video recordings.

FIG. 12 depicts a flowchart of the salient tasks associated with editing a video interview that comprises one or more portions of audio/video recordings, in accordance with the illustrative embodiment of the present invention. It will be clear to those skilled in the art, after reading this specification, which tasks depicted in FIG. 12 can be performed simultaneously or in a different order than that depicted.

At task 1201, editing system 300 estimates time codes for each word in written transcript. The estimated time codes can then be used, for example, in hyperlinks in an object document to point to the portions of the audio recording and video recordings associated with that word. The details of task 1201 are described below and with respect to FIG. 13.

At task 1202, editing system 300 selects a portion of a video recording, based on a hyperlink within an object document. The hyperlink comprises a time code that either: (i) has been estimated in task 1301 and subsequently included in the object document, or (ii) already existed as part of an audio or video recording. The details of task 1202 are described below and with respect to FIG. 14.

At task 1203, a user using editing system 300 selects an object document, based on a hyperlink within an index document. The details of task 1203 are described below and with respect to FIG. 16.

At task 1204, editing system 300 adds one or more portions of a video recording or recordings to a composite recording. The details of task 1204 are described below and with respect to FIG. 16.

Figure 13:
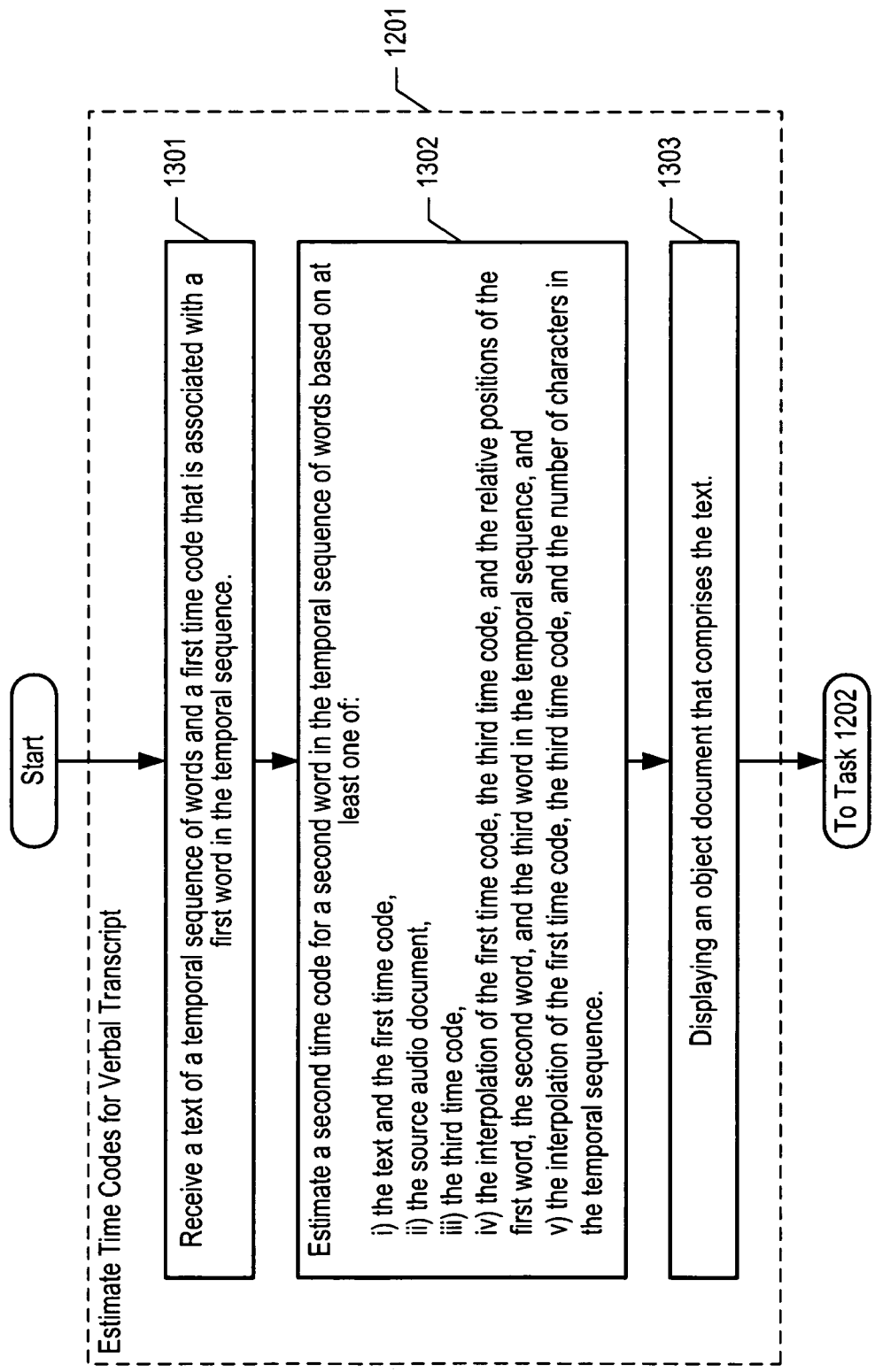
FIG. 13 depicts a flowchart of the salient tasks (i.e., the subtasks of task 1201) associated with estimating time codes, in accordance with the illustrative embodiment of the present invention.

FIG. 13 depicts a flowchart of the salient tasks (i.e., the subtasks of task 1201) associated with estimating time codes, in accordance with the illustrative embodiment of the present invention. It will be clear to those skilled in the art, after reading this specification, which tasks depicted in FIG. 8 can be performed simultaneously or in a different order than that depicted.

At task 1301, editing system 300 receives a written transcript and one or more time codes, each of which is associated with a word in the transcript. For example, editing system 300 receives the following temporal sequence of words, as depicted in FIG. 7:

| | |
|---|---|
| 9:13:07.15 | Smith: So when do you believe that tensions will ease enough in the area of conflict to allow normalize, diplomatic relations? |
| 9:13:12.26 | Jones: Well, that depends on a lot of [. . .] |

In this example, the time code "9:13:07.15" is associated with the word "So" (as spoken by Smith) and the time code "9:13:12.26" is associated with the word "Well" (as spoken by Jones).

At task 1302, editing system 300 estimates the time code for each word in the transcript that has not already been associated with a time code. In accordance with the illustrative embodiment of the present invention, this is done by interpolating the between the time code based on the number of words in the passage. For example, the passage "So when do you believe that tensions will ease enough in the area of conflict to allow normalize, diplomatic relations?" comprises 20 words between the time codes 9:13:07.15 and 9:13:12.26. The word "So" is already associated with the time code 9:13:07.15, and, therefore, a time code is estimated for the remaining 19 words based on the number of words. Equation 1 depicts this relationship:

$$TC_i = TC_1 + \frac{i}{N}(TC_N - TC_1) \quad \text{(Eq. 1)}$$

wherein $TC_i$ is the estimated time code for word i, N is the number of words between the first time code, $TC_1$, and the second time code, $TC_2$, and i=2 through N−1. In accordance with Equation 1, the timd codes for all the words in the passage, as shown in Table 1.

TABLE 1

Time Code Estimation Based On Word Interpolation

| i | Word | $TC_i$ |
|---|---|---|
| 1 | So | 9:13:07.15 |
| 2 | when | 9:13:07.64 |
| 3 | do | 9:13:07.88 |
| 4 | you | 9:13:08.12 |
| 5 | believe | 9:13:08.37 |
| 6 | that | 9:13:08.61 |
| 7 | tensions | 9:13:08.85 |
| 8 | will | 9:13:09.10 |
| 9 | ease | 9:13:09.34 |
| 10 | enough | 9:13:09.58 |
| 11 | in | 9:13:09.83 |
| 12 | the | 9:13:10.07 |
| 13 | area | 9:13:10.31 |
| 14 | of | 9:13:10.56 |
| 15 | conflict | 9:13:10.80 |
| 16 | to | 9:13:11.04 |
| 17 | allow | 9:13:11.29 |
| 18 | normalized | 9:13:11.53 |
| 19 | diplomatic | 9:13:11.77 |
| 20 | relations | 9:13:12.02 |
| 21 | Well | 9:13:12.26 |

It will be clear to those skilled in the art, after reading this specification, how to make and use alternative embodiments of the present invention that use other techniques for estimating the time code for a word or words. For example, some alternative embodiments of the present invention might use voice recognition estimate the time codes.

At task 1303, editing system 300 displays object document 611 such that each word in the transcript is a hyperlink caption with the estimated time code, or something based on the estimated time code, as part of the hyperlink.

Figure 14:
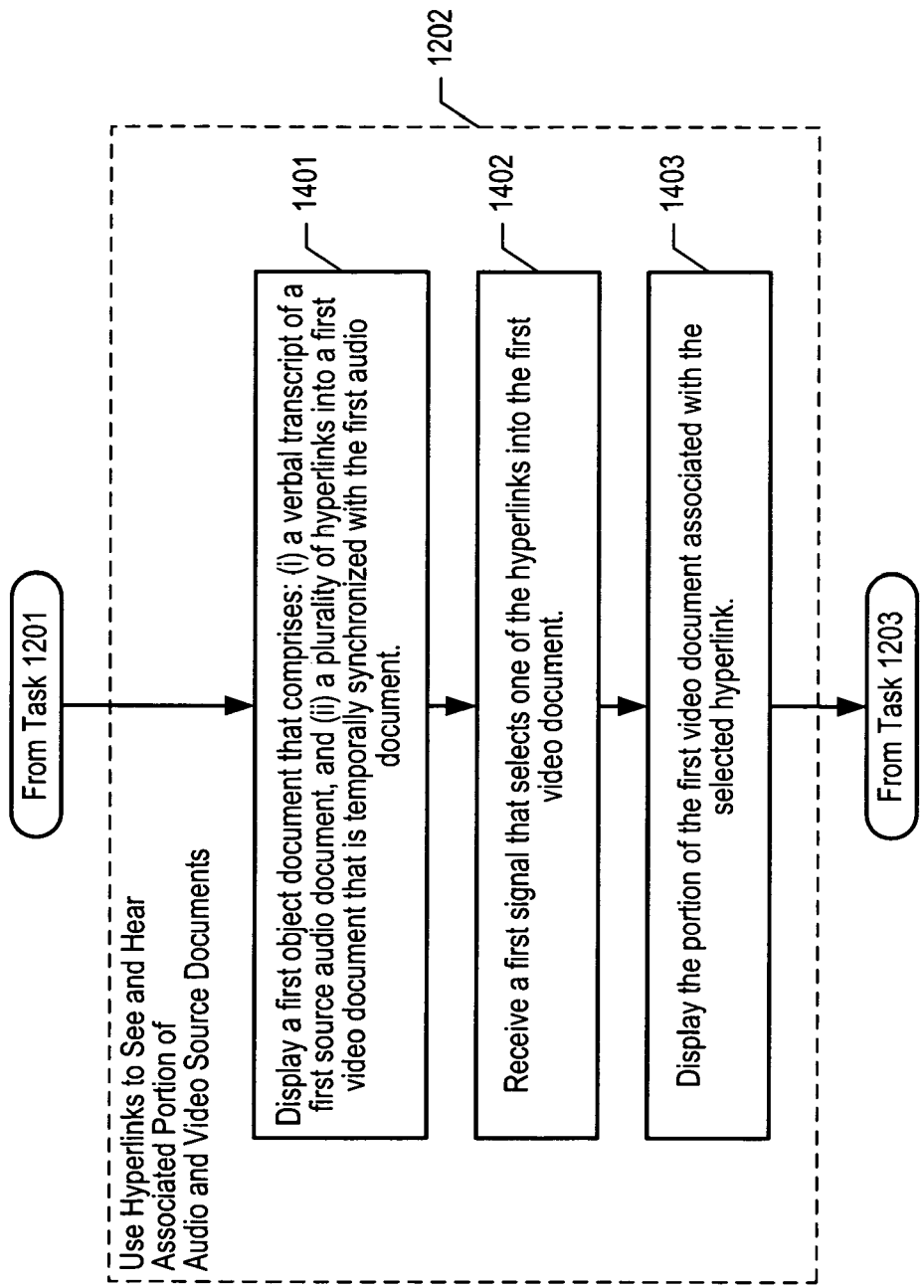
FIG. 14 depicts a flowchart of the salient tasks associated with having a user select a hyperlink caption for displaying a portion of a video recording.

FIG. 14 depicts a flowchart of the salient tasks associated with having a user select a hyperlink caption for displaying a portion of a video recording.

At task 1401, editing system 300 displays first object document 710, as shown in FIG. 7, which comprises: (i) a verbal transcript of source audio document 601, and (ii) a plurality of hyperlinks into source video document 601-1 and source video document 601-2.

At task 1402, editing system 300 receives a first signal from a user that selects a time code caption displayed in task 1401.

At task 1403, editing system 300 displays and begins to play audio recording 412-1, video recording 413-1, and video recording 413-2 at three seconds before the time associated with time code 9:13:07.15. The audio is output via speaker 311, and the video is output in pane 720. In other words, the video for both Smith, who is talking, and Jones, who is listening, are shown in pane 720. Editing system 300 continues to play audio recording 412-1, video recording 413-1, and video recording 413-2 while the transcript in pane 710 scrolls until the user stops the playing.

Figure 15:
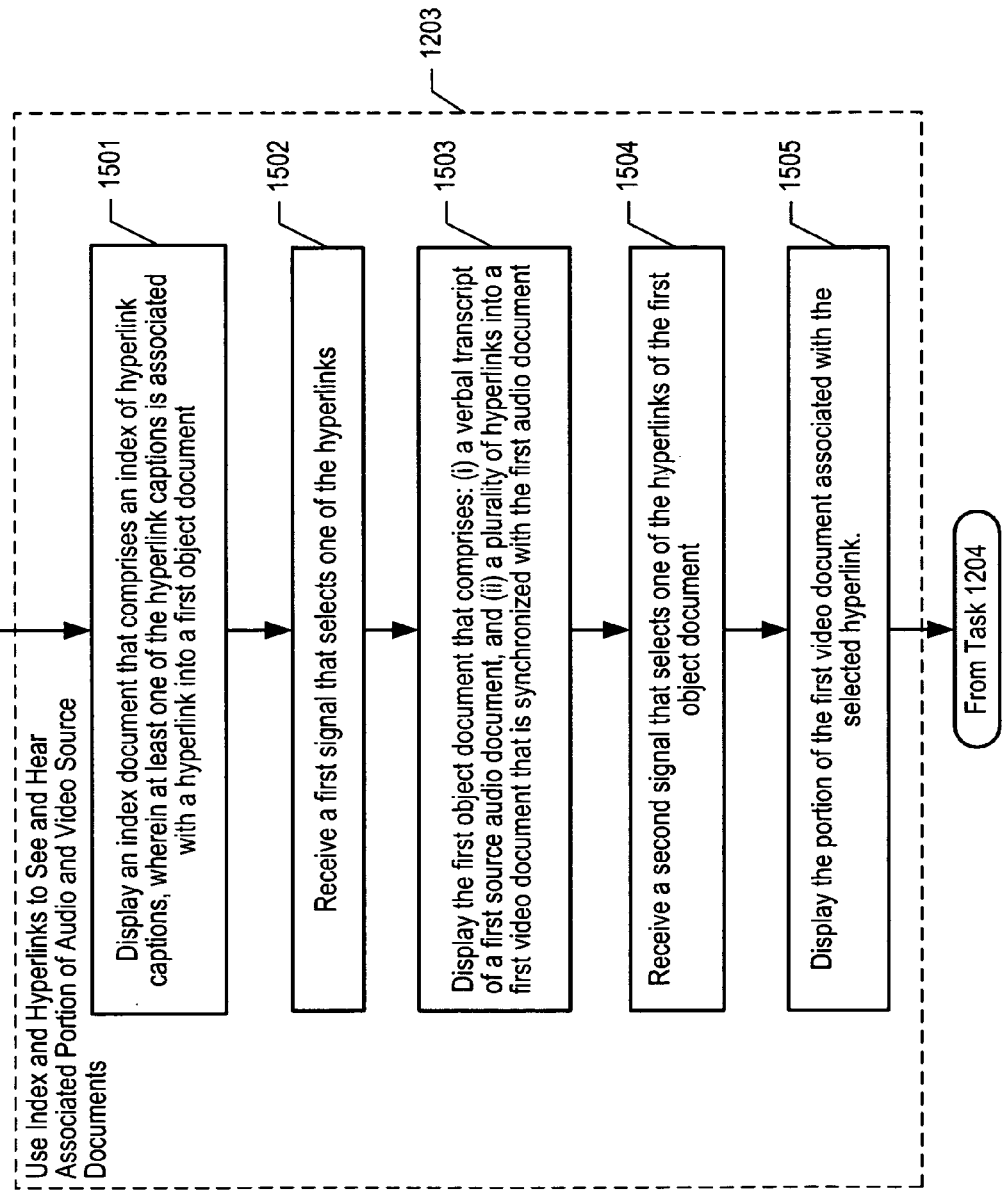
FIG. 15 depicts a flowchart of the salient tasks associated with displaying an index document and of using hyperlinks in the index document to view audio and video recordings.

FIG. 15 depicts a flowchart of the salient tasks associated with displaying an index document and of using hyperlinks in the index document to view audio and video recordings.

At task 1501, editing system 300 displays index document 504, as depicted in FIG. 7.

At task 1502, editing system 300 receives a first signal from a user which selects one of the hyperlink captions in index document 504.

At task 1503, editing system 300 displays and begins to play source video recording 602-1, source video recording 602-2, and source audio recording 601 in pane 802 at three seconds before the time associated with time code associated with the word selected in task 1502.

At task 1504, editing system 300 receives a second signal from a user which selects a second of the hyperlink captions in index document 504.

At task 1505, editing system 300 displays and begins to play source video recording 602-1, source video recording 602-2, and source audio recording 601 in pane 802 at three seconds before the time associated with time code associated with the word selected in i task 1504.

After task 1505, task execution proceeds to task 1204.

Figure 16:
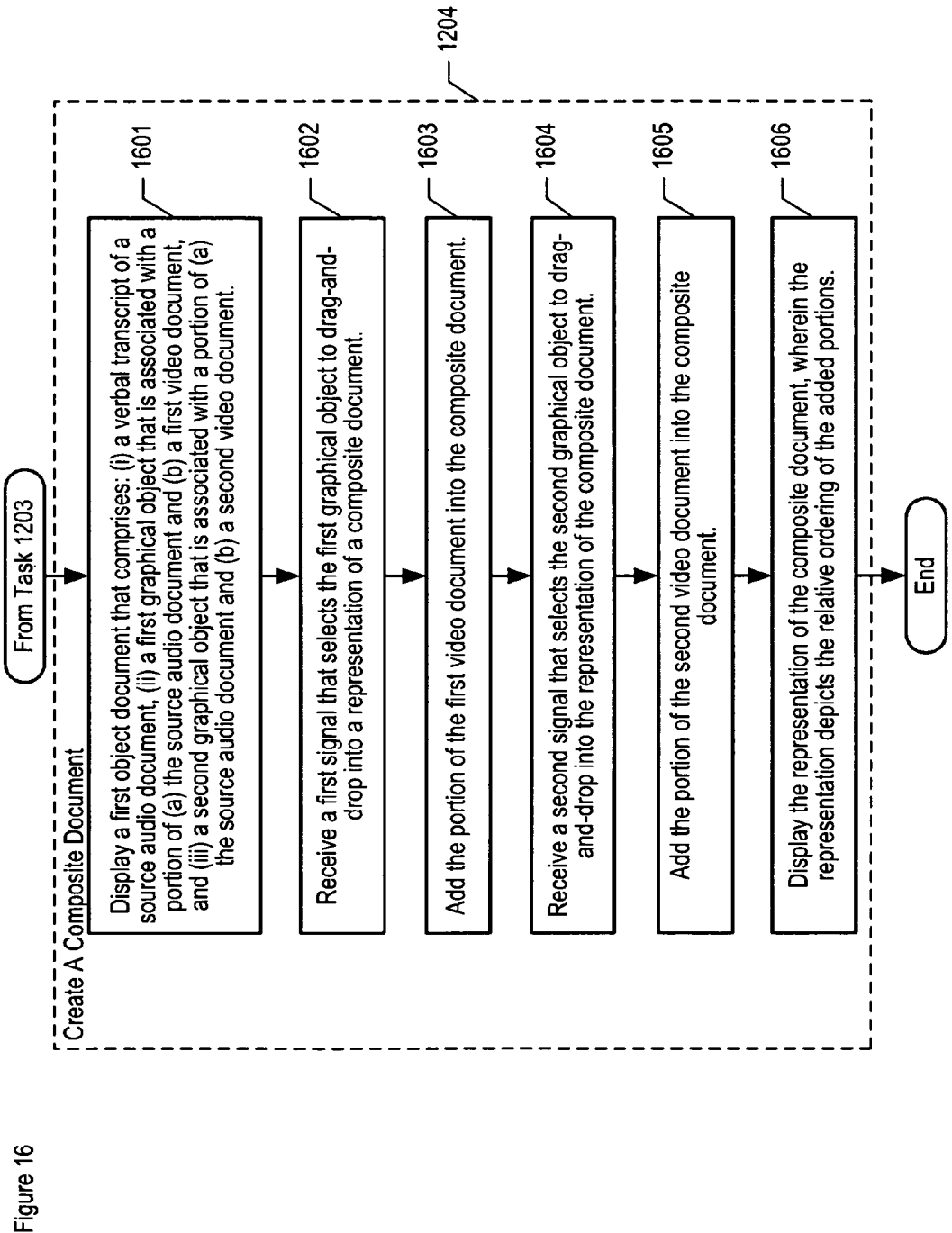
FIG. 16 depicts a flowchart of the salient tasks associated with creating and editing composite document 603.

FIG. 16 depicts a flowchart of the salient tasks associated with creating and editing composite document 603.

At task 1601, editing system 300 displays first object document 710, as depicted in FIG. 7. The first object document comprises:
(i) a verbal transcript of source audio document 601, as shown in pane 710,
(ii) a first graphical object 814-1-1, which is associated with (a) a portion of source audio document 601 and (b) source video document 602-1, and
(iii) a second graphical object 814-1-2. which is associated with (a) a portion of source audio document 601 and (b) source video document 602-2.

Figure 17:
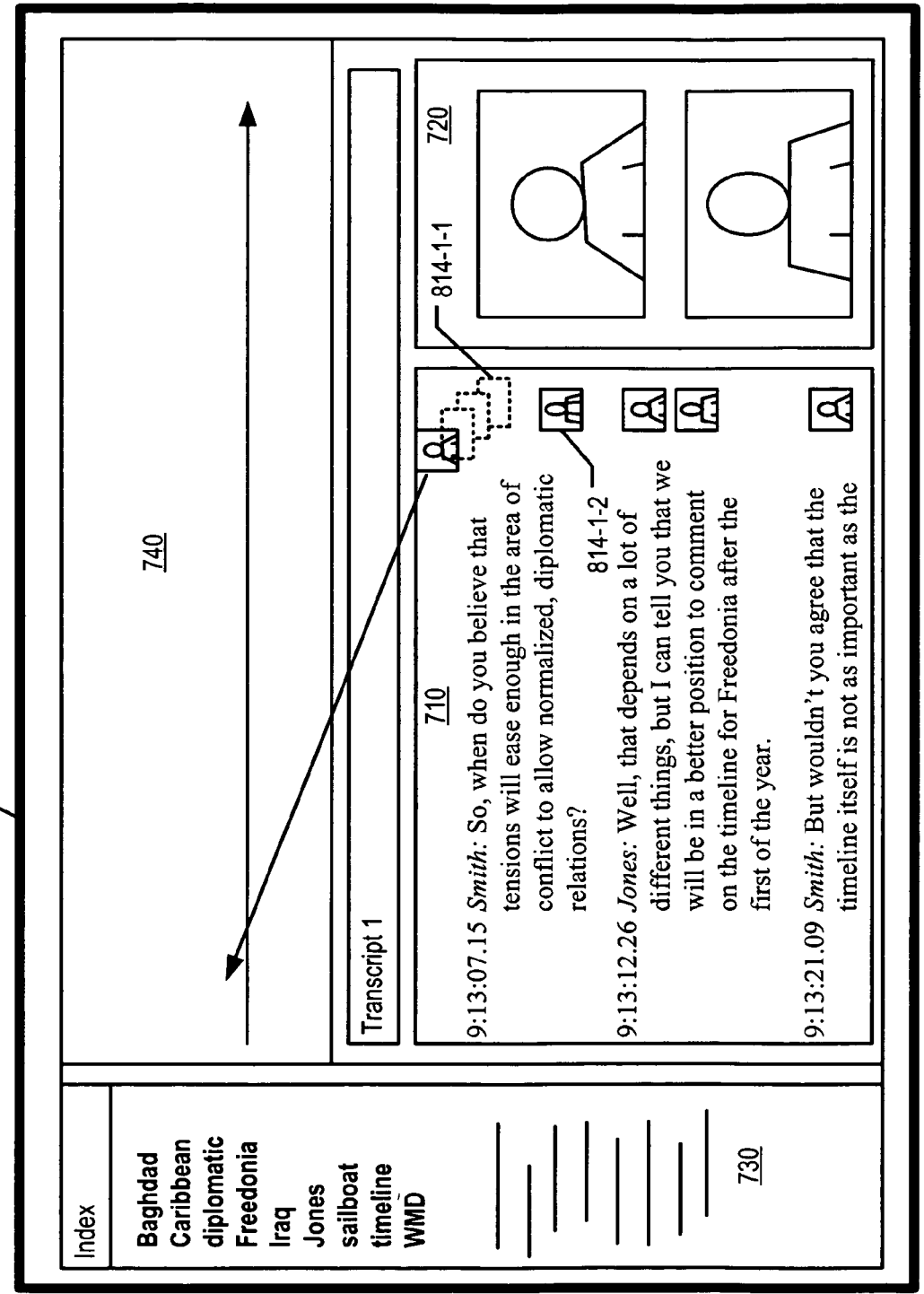
FIG. 17 depicts a first drag-and-drop operation performed by a user of editing system 300.

At task 1602, editing system 300 receives a first signal that selects the graphical object 814-1-1 and drag-and-drops it into a representation of composite document 603 in composite pane 740. FIG. 17 depicts a first drag-and-drop operation performed by a user of editing system 300 in accordance with the illustrative embodiment of the present invention. As shown in FIG. 17, the user is drag-and-dropping icon 414-1-1 onto composite pane 740, by using pointing-device 313. As described above, graphical object 814-1-1 represents a portion of source video document 602-1. The effect of the drag-and-drop operation, in the illustrative embodiment of the present invention, is that the portion is added to composite document 603.

At task 1603, editing system 300 adds the portion of source video document 602-1 into composite document 603, in well-known fashion.

Figure 18:
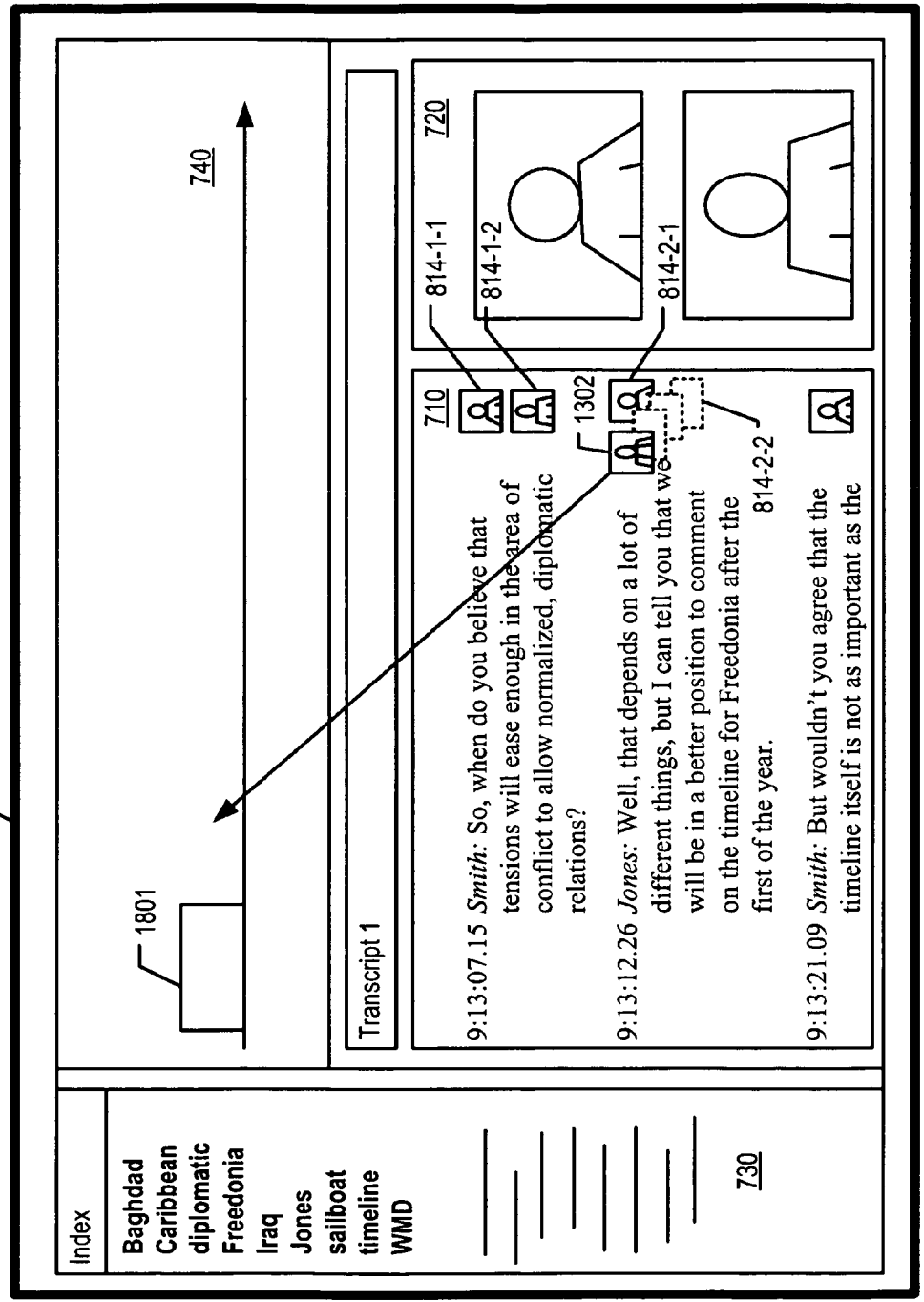
FIG. 18 depicts a second drag-and-drop operation performed by a user of editing system 300.

At task 1604, editing system 300 receives a second signal that selects the graphical object 814-2-2 and drag-and-drops it into the representation of composite document 603 in composite pane 740. This is depicted in FIG. 18.

Figure 19:
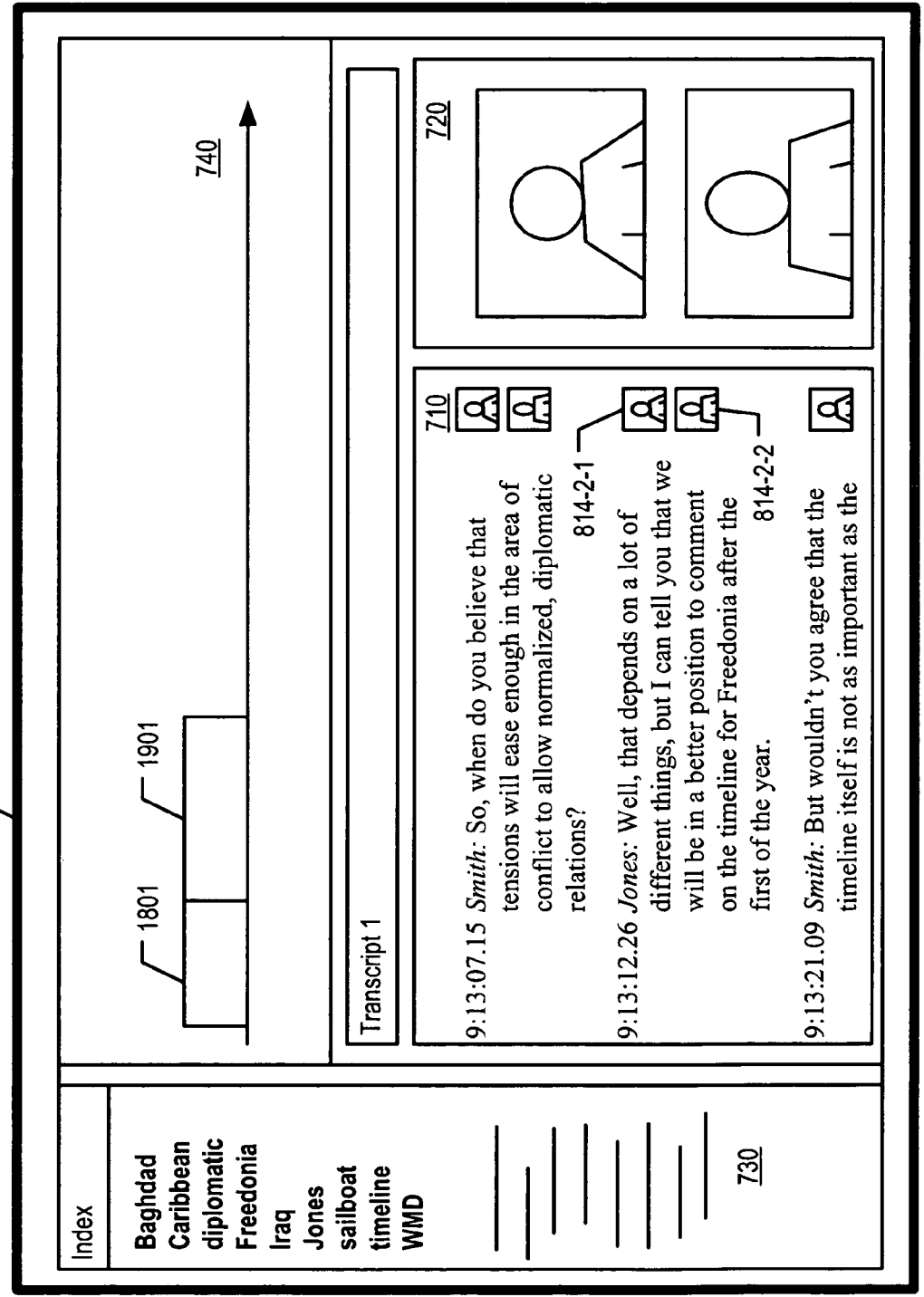
FIG. 19 depicts composite pane 740 after task 1604.

FIG. 19 depicts composite pane 740 after task 1604. After task 1604 is performed, the composite recording representation displayed in composite pane 740 comprises display object 1301 that has replaced icon 1201, indicating that the portion of video is in composite document 603. Note that graphical object 814-1-1 is still in its original position; the reason for this is that the drag-and-drop operation did not move the file for the portion of video in the file system of data-processing system 301. The effect of task 1604 is that the portion is added to composite document 603.

At task 1605, editing system 300 adds the portion of source video document 602-2 into composite document 603. FIG. 14 depicts composite pane 740 after the drag-and-drop operation of FIG. 13, in accordance with the illustrative embodiment of the present invention. As shown in FIG. 14, the composite recording representation displayed in composite pane 740 comprises, in addition to display object 1301, display object 1401 that has replaced icon 1302, indicating that the portion of video is in composite document 603. Note that graphical object 814-2-2 is still in its original position; the reason for this is that the drag-and-drop operation did not move the file for the portion of video in the file system of data-processing system 301.

At task 1606, editing system 300 displays the representation of composite document 603. The representation is displayed in composite pane 740. The representation depicts the relative ordering of the added portions.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
 (a) displaying a first object document that comprises:
  (i) a verbal transcript of a first audio recording, and
  (ii) a plurality of hyperlinks into a first video recording that is temporally synchronized with said first audio recording;
 (b) receiving a first signal that selects one of said hyperlinks into said first video recording;
 (c) displaying the portion of said first video recording associated with said hyperlink selected by said first signal; and
 (d) displaying, as a result of displaying the first object document, an index document that comprises an index of hyperlink captions;
 wherein the verbal transcript comprises a text of a temporal sequence of words and a first time code that is associated with a first word in said temporal sequence of words; and
 wherein estimating a second time code for a second word in said temporal sequence of words is based on said text and said first time code.

2. The method of claim 1 wherein each of said hyperlinks into said first video recording associates a portion of said first video recording with a hyperlink caption in said first object document; and
 wherein said hyperlink caption in said first object document is at least one of the first time code and the second time code.

3. The method of claim 1 wherein each hyperlink of said plurality of hyperlinks comprises a hyperlink reference that comprises at least one of the first time code and the second time code.

4. The method of claim 1 wherein said first object document further comprises (iii) a plurality of hyperlinks into a second video recording that is temporally synchronized with said first audio recording, wherein each of said hyperlinks into said second video recording associates a portion of said second video recording with a hyperlink caption in said first object document.

5. The method of claim 1 wherein at least one of said hyperlink captions in said index is associated with a hyperlink into said first object document and a second object document.

6. The method of claim 5 further comprising:
 (e) receiving a second signal that selects one of said hyperlinks into said second object document; and
 (f) displaying the portion of said second object document associated with said hyperlink selected by said second signal;
 wherein said second object document comprises:
  (i) a verbal transcript of a second audio recording, and
  (ii) a plurality of hyperlinks into a second video recording that is temporally synchronized with said second audio recording, wherein each of said hyperlinks into said second video recording associates a portion of said second video recording with a hyperlink caption in said second object document.

7. The method of claim 6 further comprising:
 (g) receiving a third signal that selects one of said hyperlinks in said second object document into said second video recording; and
 (h) displaying the portion of said second video recording associated with said hyperlink selected by said third signal.

8. The method of claim 7 wherein said first video recording and said second video recording are recorded during different interviews.

9. A method comprising:
(a) displaying an index document that comprises an index of hyperlink captions, wherein at least one of said hyperlink captions is associated with a hyperlink into a first object document, wherein said first object document comprises:
(i) a verbal transcript of a first audio recording, and
(ii) a plurality of hyperlinks into a first video recording that is temporally synchronized with said first audio recording;
(b) receiving a first signal that selects one of said hyperlinks in said index document; and
(c) displaying the portion of said first object document associated with said hyperlink selected by said first signal;
wherein the verbal transcript comprises a text of a temporal sequence of words and a first time code that is associated with a first word in said temporal sequence of words; and
wherein estimating a second time code for a second word in said temporal sequence of words is based on said text and said first time code.

10. The method of claim 9 wherein each of said hyperlinks into said first video recording associates a portion of said first video recording with a hyperlink caption in said first object document; and
wherein said hyperlink caption in said first object document is at least one of the first time code and the second time code.

11. The method of claim 9 wherein each of said plurality of hyperlinks in said first object document comprises a hyperlink reference that comprises at least one of the first time code and the second time code.

12. The method of claim 9 further comprising:
(d) receiving a second signal that selects one of said hyperlinks in said first object document into said first video recording; and
(e) displaying the portion of said first video recording associated with said hyperlink selected by said second signal.

13. The method of claim 12 wherein at least one of said hyperlink captions in said index document is associated with a hyperlink into a second object document, wherein said second object document comprises:
(i) a verbal transcript of a second audio recording, and
(ii) a plurality of hyperlinks into a second video recording that is temporally synchronized with said second audio recording, wherein each of said hyperlinks into said second video recording associates a portion of said second video recording with a hyperlink caption in said second object document; and further comprising:
(d) receiving a second signal that selects one of said hyperlinks in said index document; and
(e) displaying the portion of said second object document associated with said hyperlink selected by said second signal.

14. The method of claim 13 wherein said first audio recording and said second audio recording are recorded during different interviews.

15. A method comprising:
(a) displaying a first object document that comprises:
(i) a verbal transcript of an audio recording, and
(ii) a plurality of hyperlinks into a first video recording that is temporally synchronized with said first audio recording; and displaying an index document that comprises:
(i) an index of hyperlink captions, and
(ii) a plurality of hyperlinks into said first object document and a second object document;
wherein the verbal transcript comprises a text of a temporal sequence of words and a first time code that is associated with a first word in said temporal sequence of words; and
wherein estimating a second time code for a second word in said temporal sequence of words based on said text and said first time code.

16. The method of claim 15 wherein the first object document also comprises:
(iii) a first graphical object that is associated with a portion of said audio recording and a portion of a first video recording, and
(iv) a second graphical object that is associated with a portion of said audio recording and a portion of a second video recording.

17. The method of claim 16 further comprising:
(b) adding to a composite recording, before displaying the index document, a portion of said first video recording associated with said first graphical object and a portion of said second video recording associated with said second graphical object.

18. The method of claim 17 further comprising displaying said representation of said composite recording;
wherein the representation depicts the relative ordering of the portion of said first video recording and the portion of said second video recording; and
wherein each of said hyperlinks into said first object document associates a portion of said first object document with a hyperlink caption in said index.

19. A method comprising:
receiving a text of a temporal sequence of words and a first time code that is associated with a first word in said temporal sequence of words; and
estimating a second time code for a second word in said temporal sequence of words based on said text and said first time code;
wherein said text is a verbal transcript of an audio recording; and
wherein said verbal transcript is part of a object document that comprises a plurality of hyperlinks into a video recording that is temporally synchronized with said audio recording; and
wherein each of said hyperlinks into said video recording associates a portion of said video recording with a hyperlink caption in said object document.

20. The method of claim 19 further comprising displaying said object document, wherein one of said hyperlinks into said video recording associates a portion of said video recording with said second word in said object document.

21. The method of claim 19 further comprising receiving an audio recording of said temporal sequence of words; and
wherein the estimating of said second time code for said second word in said temporal sequence of words is also based on said audio recording.

22. The method of claim 19 further comprising receiving a third time code that is associated with a third word in said temporal sequence of words; and wherein the estimating of said second time code for said second word in said temporal sequence of words is also based on said third time code.

23. The method of claim 22 wherein said second time code is based on the interpolation of said first time code, said third time code, and the relative positions of said first word, said second word, and said third word in said temporal sequence of words.

24. The method of claim 22 wherein said second time code is based on the interpolation of said first time code, said third time code, and the number of characters in said temporal sequence of words.

* * * * *